(12) United States Patent
Jones, Jr. et al.

(10) Patent No.: US 7,992,343 B1
(45) Date of Patent: Aug. 9, 2011

(54) FLEXIBLE FISHING LURE THAT TRAPS AIR

(76) Inventors: Nyles Kelley Jones, Jr., Deer Park, TX (US); Nyles Kelley Jones, Sr., La Porte, TX (US)

( * ) Notice: Subject to any disclaimer, the term of this patent is extended or adjusted under 35 U.S.C. 154(b) by 0 days.

(21) Appl. No.: 12/184,601

(22) Filed: Aug. 1, 2008

(51) Int. Cl.
*A01K 85/00* (2006.01)
(52) U.S. Cl. .............................................. 43/42.24
(58) Field of Classification Search .............. 264/319; 43/42.24, 4.5; 249/114.1
See application file for complete search history.

(56) References Cited

U.S. PATENT DOCUMENTS

| 4,074,455 A * | 2/1978 | Williams, Jr. ........... 43/42.06 |
| 6,775,944 B1 * | 8/2004 | Jones, Jr. ............... 43/4.5 |
| 6,948,695 B1 * | 9/2005 | Clark .................. 249/114.1 |

* cited by examiner

*Primary Examiner* — Christina Johnson
*Assistant Examiner* — Larry Thrower
(74) *Attorney, Agent, or Firm* — Buskop Law Group, PC; Wendy Buskop

(57) ABSTRACT

A flexible fishing lure comprising: a head integral with an egg sack, a body integral with the egg sack opposite the head, at least two air trapping cavities disposed adjacent each other along a central axis in the body for trapping and retaining air during lure movement, and a tail integral with the body. The tail is tapered to a point and rises when the head is engaged with a hook, and the tail remains at an elevated position above the head when submerged in water.

9 Claims, 2 Drawing Sheets

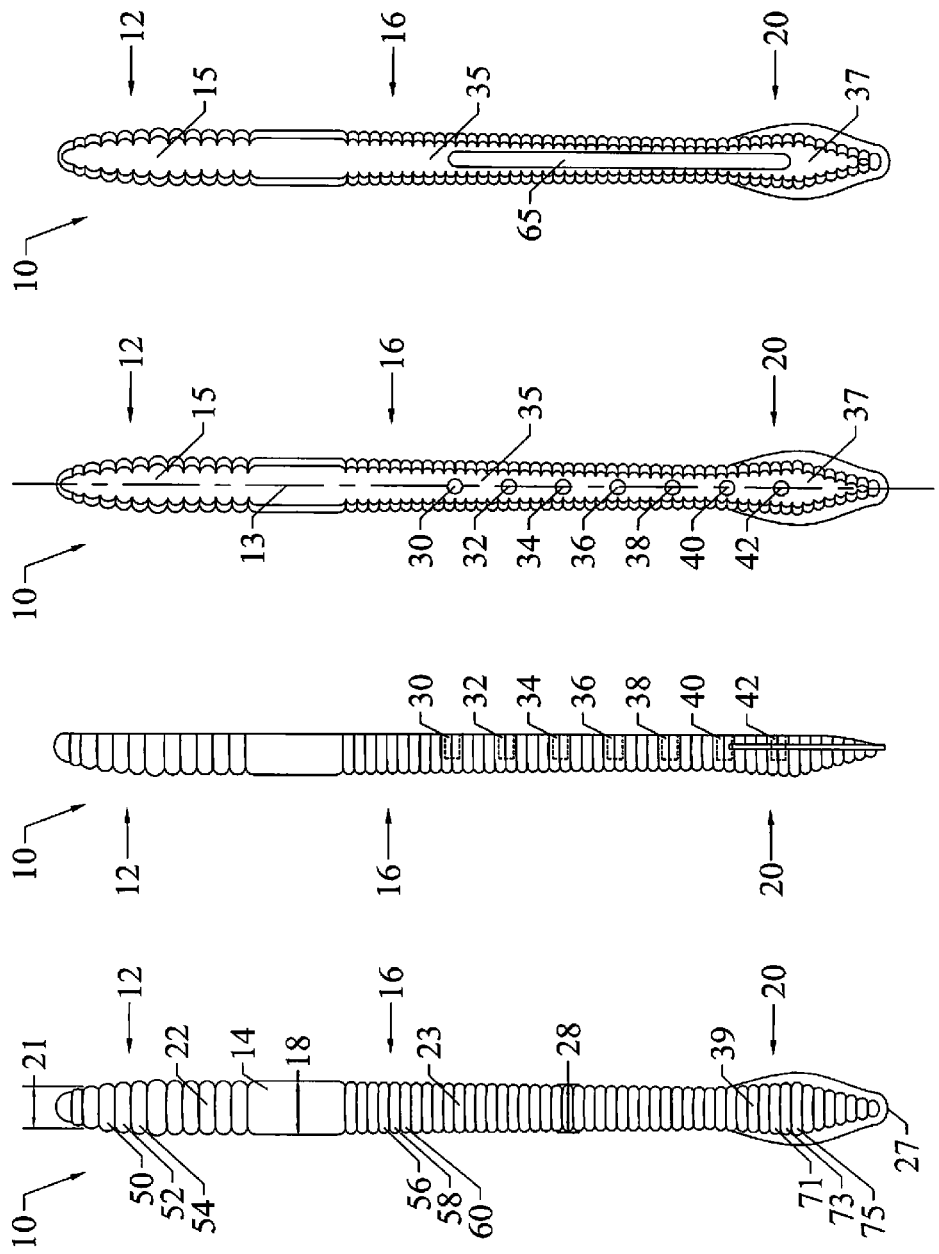

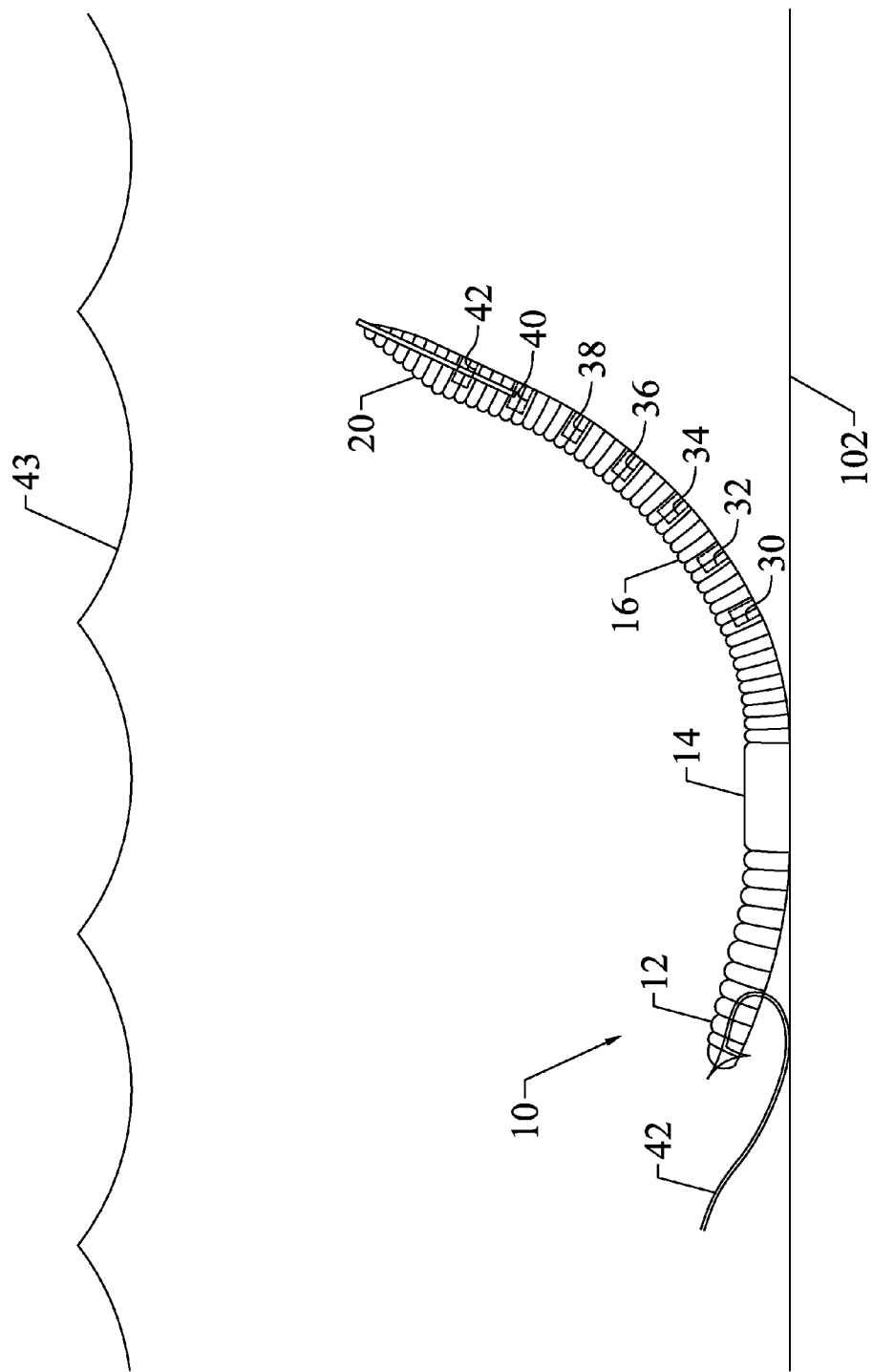

FLEXIBLE FISHING LURE THAT TRAPS AIR

FIELD

The present embodiments relate to a flexible fishing lure.

BACKGROUND

A need exists for an flexible fishing lure which can appear to be a live worm while resting on the bottom or floating in a body of water, through use of a floating tail that traps air.

A further need exists for a lure with an egg sack that has a realistic appearance while dropping to the bottom of a body of water.

The present embodiments meet these needs.

BRIEF DESCRIPTION OF THE DRAWINGS

The detailed description will be better understood in conjunction with the accompanying drawings as follows:

FIG. 1 is a top view of the flexible fishing lure.
FIG. 2 is a side view of the flexible fishing lure.
FIG. 3 is a bottom view of the flexible fishing lure.
FIG. 4 is an alternative view of the flexible fishing lure.
FIG. 5 is a side view of the flexible fishing lure being used in a body of water.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a flexible fishing lure that appears to be live worm while resting on the bottom with its tail up, and into the current or water while the head is on the bottom of a body of water, such as a lake, pond, creek, sea, ocean, or the like.

The flexible fishing lure has a head integral with an egg sack. The diameter of the head is smaller in diameter than the diameter of the egg sack, by about 10 percent. The head can have a head diameter of about ⅛ of an inch and the egg sack can have an egg sack diameter of about 3/16 of an inch.

The head can have a head ridged side with a plurality of concentric ridges covering about ¾ around the circumference of the head, and a head smooth side covering about ¼ of the circumference of the head. Each ridge can rise about 1 millimeters above a valley, just like a real worm with ridges.

The body can be integral with the egg sack opposite the head. The body can have a body smooth side and a body ridged side, like the head, and in the same percentages to create a realistic looking worm. The body has a body diameter that is slightly smaller, about 10 percent smaller than the egg sack diameter.

The flexible fishing lure is typically about 4 inches to about 8 inches long, but in an embodiment, can range from about 3 inches to about 12 inches in length.

The flexible fishing lure can have a tail tapered to a point with a tail smooth side and a tail ridged side. The tail, like the head and body, has concentric ridges. The tail can be tapered to a point or tapered to a plane face. The tail can fan out and then become smaller in diameter towards the end of the tail opposite the head.

The tail can have a diameter at its largest spot ranging from about 1/16 inches to about ¼ inches in diameter.

At least two air trapping cavities can be disposed in the body smooth side and adjacent to each other along a central axis of the flexible fishing lure for trapping and retaining air during movement of the lure in water. The tail can be tapered to a point and can raise in water as air is trapped in the air trapping cavities maintaining the tail at an elevated position in relation to the head.

The head of the flexible fishing lure can be engaged to a hook, with or without a weight, that can drop to the bottom of a body of water. The tail, with the air trapping cavities, rises above the head and hook imitating a live worm that burrows in the bottom of a lake bed or other area on the bottom of a body of water.

In an embodiment, the flexible fishing lure can be made of a solid polymer, such as a blend of elastomer and clear polypropylene, polyethylene, urethane, combinations thereof, or any other comparable materials capable of creating a slightly gummy but wiggly lure when pulled through water.

In another embodiment, the worm can be slightly hollow.

In still another embodiment the air trapping cavities can form a channel that extends on the smooth side of the body from a midpoint to just above the tail.

The at least two air trapping cavities are formed in the body and typically are formed by drilling into already formed flexible fishing lure or are formed during the molding process of the lure. The mold can have a plurality of small dowels around which the polymer is poured and then the dowels make the air trapping cavities when the flexible fishing lure is pulled off the dowels.

The air trapping cavities are long and can penetrate at right angles to the central axis, and through most of the diameter of the body, though not through the entire diameter of the body.

In another embodiment the air trapping cavities can be angled into the body at a slope between about 60 degrees to about 40 degrees.

The air trapping cavities are long enough to trap small amounts of air while the elasticity of the polymer slightly closes off at the edge of the body, creating small air pockets. The air can be removed, if desired, by squeezing the tail between the thumb and forefinger, causing the air to be pushed out of the air trapping cavities.

The retained air enables in the second portion of the body cause the "tail" to rise up, above the bottom of a body of water, and provide the appearance of a burrowing worm protruding from its hole, and boldly sticking up, ready for feeding.

It is contemplated that the flexible fishing lure can have from 2 air trapping cavities to 12 or more air trapping cavities in the body and possible additional cavities in the first half of the tapered tail, to create the most realistic appearance.

It is contemplated that the air trapping cavities are not made in the egg sack or in the head of the flexible lure. The entrapment of air in the body enables the air to provide the flexible lure with a graceful movement when submerged in water, having a raised tail.

In an embodiment, the flexible fishing lure can have a shovel-like head. In additional embodiments, the flexible fishing lure can further have a symmetrical pen-shaped head or a round like head.

The head, egg sack and body can be cylindrical in shape or a tapered cylinder.

It is also contemplated that the lures can be made from a polymer mixed with a scent. The scent can be a blood worm scent, a crawfish sent, a garlic sent, or an additional scent that may attract fish.

It is contemplated that the lures can have additional additives, like sparkles, flecks, or pigmentation mixed into the polymer, providing the lure with light reflecting portions and/or color, such as brown, red, or translucent orange.

The volume of the at least two air trapping cavities can be contemplated to be small such as less than about ½ of a millimeter in diameter and a very small volume, equivalent to 1 drop of water.

The flexible fishing lure can have a length ranging from about 3 inches to about 12 inches from the end of the head to the end of the tail. The flexible fishing lure can be a single color, or the flexible fishing lure can have multi-colorings.

The body of the flexible fishing lure can have a first color, and at least one of the air trapping cavities can have a second color. The color can be added manually, using markers or similar coloring means. Color can also be added to the concentric ridges or the smooth surface along the body and/or tail. Use of color can provide the flexible fishing lure with the appearance of a real worm for attracting fish.

In addition to having a color, it is contemplated that a portion of the body can be at least partially transparent.

In still another embodiment, it is contemplated that each of the air trapping cavities can be a plurality of connected air trapping cavities. The plurality of air trapping cavities can be used to trap air continuously.

The air trapping cavities in the body can be of a general conical shape. Other shapes, such as elliptical shapes, are also contemplated.

During operation, it is contemplated that the tail of the flexible fishing lure rises and remains in an elevated position when submerged in water or resting at the bottom of a body of water, due to air trapped in the cavities.

FIG. 1 depicts the flexible fishing lure (10) with a head (12) integral with an egg sack (14). The head (12) has a plurality of concentric ridges (50, 52, and 54), only three are shown in this Figure, along a head ridged side (22). The head (12) has a head diameter (21) which can be about ¼ inch.

The egg sack (14) is shown as a generally smooth, cylindrical section having an egg sack diameter (18) that is about 10 percent bigger than the head diameter (21) and the body diameter (28) Secured to the egg sack, opposite the head is a body (16). Secured to the body (16) is a tail (20) that tapers to a point (27).

The body (16) has a plurality of concentric ridges (56, 58, and 60) along a body ridged side (23).

The tail (20) has a plurality of concentric ridges (71, 73, and 75) along the tail ridged side (39).

FIG. 2 shows a side view of the flexible fishing lure, cut down the middle of the top side and revealing 7 air trapping cavities, (30, 32, 34, 36, 38, 40, and 42). Additional air trapping cavities or less can be used.

FIG. 3 shows the smooth side of the head (15), the smooth side of the body (35) and the smooth side of the tail (37). FIG. 3 further shows the air trapping and releasing cavities from a front (30, 32, 34, 36, 38, 40 and 42).

All air trapping cavities can be disposed in the smooth sides, and can be aligned with one another, along the central axis (13) of the one-piece flexible fishing lure.

The air trapping cavities can trap and retain less than about 1 milliliter of air during use and can provide the one-piece flexible fishing lure with movement while under water. Air can enter the air trapping cavities, while the one-piece flexible fishing lure is out of water. When submerged, the polymer from which the one-piece flexible fishing lure is made can close around the air trapping cavities, enabling the high tail swishing action to make the one-piece flexible fishing lure seem like a worm which is real and alive, attracting fish.

FIG. 4 shows an embodiment of the air trapping cavities as a channel (65) disposed in the smooth side of the body (35) of the flexible fishing lure (10).

FIG. 5 shows the flexible fishing lure (10) with the head (12) attached to a hook (42) resting on the bottom (102) of a body of water. The flexible fishing lure is shown in water (43) with the tail (20) rising up while in the water. The head of the flexible fishing lure is shown rising above the hook due to air trapped within the air trapping cavities.

It is contemplated that these cavities can be used in other designer worms, such as applicant's own Weedless Wacky Worm™ described in the patent applications having Ser. Nos. 10/235,330, and 10/235,307, now U.S. Pat. Nos. 6,843,016 and 6,775,944, respectively, each filed Sep. 5, 2002, the entirety of which are incorporated herein by reference.

While these embodiments have been described with emphasis on the embodiments, it should be understood that within the scope of the appended claims, the embodiments might be practiced other than as specifically described herein.

What is claimed is:

1. A fishing lure consisting of:
   a. a head connected to an end of a body; and
   b. a tail connected to an end of the body opposite the end of the body connected to the head, wherein the tail and the body each comprise a smooth side and a ridged side, wherein each smooth side comprises a plurality of air trapping and releasing cavities axially aligned with each other along a central axis of the body, wherein each ridged side is absent of any air trapping and releasing cavities, and wherein each of the plurality of air trapping and releasing cavities has a depth perpendicular to the central axis that is greater than a diameter of that air trapping and releasing cavity, and wherein the head consists of a smooth side absent of any air trapping and releasing cavities and a ridged side absent of any air trapping and releasing cavities.

2. The fishing lure of claim 1, wherein the body is a first color, and wherein the plurality of air trapping and releasing cavities are a second color creating the illusion of body organs.

3. A fishing lure consisting of:
   a. a head connected to an end of a body; and
   b. a tail connected to an end of the body opposite the end of the body connected to the head, wherein the tail and the body each comprise a smooth side and a ridged side, wherein each smooth side comprises a plurality of air trapping and releasing cavities axially aligned with each other and with a central axis of the body, wherein the air trapping a releasing cavities change the buoyancy of the lure with the air trapping and releasing cavities when air is trapped, and wherein the arrangement of air trapping and releasing cavities are configured to raise the tail above the head to simulate a burrowing worm, wherein each ridged side is absent of any air trapping and releasing cavities, wherein each of the air trapping and releasing cavities has a conical shape, an elliptical shape, or combinations thereof, and wherein each of the plurality of air trapping and releasing cavities has a depth perpendicular to the central axis that is greater than a diameter of that air trapping and releasing cavity, and wherein the head consists of a smooth side absent of any air trapping and releasing cavities and a ridged side absent of any air trapping and releasing cavities.

4. The fishing lure of claim 3, wherein the fishing lure is made of a polymer, and wherein light reflecting sparkles are mixed with the polymer.

5. The fishing lure of claim 3, wherein the body is at least partially transparent.

6. The fishing lure of claim 3, wherein the head comprises a tapered generally cylindrical shape.

7. A fishing lure consisting of:
a. a head connected to an end of a body; and
b. a tail connected to an end of the body opposite the end of the body connected to the head, wherein the tail and the body each comprise a smooth side and a ridged side, wherein each smooth side comprises a plurality of air trapping and releasing cavities axially aligned with each other and with a central axis of the body, wherein the arrangement of air trapping and realizing cavities are configured to raise the tail above the head to simulate a burrowing worm, and wherein each of the plurality of air trapping and releasing cavities has a depth perpendicular to the central axis that is greater than a diameter of that air trapping and releasing cavity, and wherein the head consists of a smooth side absent of any air trapping and releasing cavities and a ridged side absent of any air trapping and releasing cavities.

8. The fishing lure of claim 7, wherein fishing lure is made of a solid polymer.

9. The fishing lure of claim 7, wherein the fishing lure is made of a polymer, and wherein light reflecting sparkles are mixed with the polymer.

* * * * *